US012664419B2

(12) United States Patent
Song et al.

(10) Patent No.: US 12,664,419 B2
(45) Date of Patent: Jun. 23, 2026

(54) LEARNING UNIFIED EMBEDDING

(71) Applicant: Google LLC, Mountain View, CA (US)

(72) Inventors: Yang Song, San Jose, CA (US); Yuan Li, Fremont, CA (US); Bo Wu, Pleasanton, CA (US); Chao-Yeh Chen, Mountain View, CA (US); Xiao Zhang, Mountain View, CA (US); Hartwig Adam, Marina del Rey, CA (US)

(73) Assignee: GOOGLE LLC, Mountain View, CA (US)

( * ) Notice: Subject to any disclaimer, the term of this patent is extended or adjusted under 35 U.S.C. 154(b) by 1058 days.

(21) Appl. No.: 16/494,842

(22) PCT Filed: Nov. 17, 2017

(86) PCT No.: PCT/US2017/062222
§ 371 (c)(1),
(2) Date: Sep. 17, 2019

(87) PCT Pub. No.: WO2019/017990
PCT Pub. Date: Jan. 24, 2019

(65) Prior Publication Data
US 2020/0090039 A1 Mar. 19, 2020

Related U.S. Application Data

(60) Provisional application No. 62/533,535, filed on Jul. 17, 2017.

(51) Int. Cl.
*G06N 3/08* (2023.01)
*G06N 20/00* (2019.01)
(Continued)

(52) U.S. Cl.
CPC ............... *G06N 3/08* (2013.01); *G06N 20/00* (2019.01); *G06V 10/454* (2022.01);
(Continued)

(58) Field of Classification Search
CPC .......... G06N 3/08; G06N 20/00; G06N 20/10; G06V 10/255
(Continued)

(56) References Cited

U.S. PATENT DOCUMENTS 9,990,687 B1 * 6/2018 Kaufhold ........... H04N 1/32267
11,068,660 B2 * 7/2021 Al Hasan ............. G06N 3/0454
(Continued)

FOREIGN PATENT DOCUMENTS

CN 106649886 5/2017
CN 106897390 6/2017
(Continued)

OTHER PUBLICATIONS

Deep Learning based Large Scale Visual Recommendation and Search for E-Commerce (Year: 2017).*
(Continued)

*Primary Examiner* — Omar F Fernandez Rivas
*Assistant Examiner* — Em N Trieu
(74) *Attorney, Agent, or Firm* — DORITY & MANNING, P.A.

(57) ABSTRACT

A computer-implemented method for generating a unified machine learning model using a neural network on a data processing apparatus is described. The method includes the data processing apparatus determining respective learning targets for each of a plurality of object verticals. The data processing apparatus determines the respective learning targets based on two or more embedding outputs of the neural network. The method also includes the data processing apparatus training the neural network to identify data associated with each of the plurality of object verticals. The data processing apparatus trains the neural network using the respective learning targets and based on a first loss function. The data processing apparatus uses the neural network
(Continued)

trained to generate a unified machine learning model, where the model is configured to identify particular data items associated with each of the plurality of object verticals.

20 Claims, 5 Drawing Sheets

(51) Int. Cl.
| | |
|---|---|
| *G06V 10/44* | (2022.01) |
| *G06V 10/764* | (2022.01) |
| *G06V 10/776* | (2022.01) |
| *G06V 10/82* | (2022.01) |
| *G06V 40/10* | (2022.01) |

(52) U.S. Cl.
CPC .......... *G06V 10/764* (2022.01); *G06V 10/776* (2022.01); *G06V 10/82* (2022.01); *G06V 40/10* (2022.01)

(58) Field of Classification Search
USPC .......................................................... 706/15
See application file for complete search history.

(56) References Cited

U.S. PATENT DOCUMENTS

| | | | | |
|---|---|---|---|---|
| 2008/0065273 A1* | 3/2008 | Gerrity | ................ | G05B 13/042 |
| | | | | 701/1 |
| 2014/0279753 A1* | 9/2014 | Dalessandro | .......... | G06N 20/20 |
| | | | | 706/12 |
| 2015/0294192 A1* | 10/2015 | Lan | ...................... | G06K 9/6218 |
| | | | | 382/159 |
| 2016/0321522 A1 | 11/2016 | Yuan et al. | | |
| 2017/0132528 A1 | 5/2017 | Aslan et al. | | |

FOREIGN PATENT DOCUMENTS

| | | |
|---|---|---|
| CN | 106951911 | 7/2017 |
| WO | WO 2016/100717 | 6/2016 |

OTHER PUBLICATIONS

Learning Local Image Descriptors with Deep Siamese and Triplet Convolutional Networks by Minimizing Global Loss Functions (Year: 2016).*
Evaluation of Output Embeddings for Fine-Grained Image Classification (Year: 2015).*
Multi-loss Regularized Deep Neural Network (Year: 2016).*
Improving Triplet-Wise Training of Convolutional Neural Network for Vehicle Re-Identification (Year: 2017).*
Normalization Propagation: A Parametric Technique for Removing Internal Covariate Shift in Deep Networks (Year: 2016).*
Ioffe et al., "Batch Normalization: Accelerating Deep Network Training by Reducing Internal Covariate Shift," arXiv, Mar. 2015, 11 pages.
Howard et al., "MobileNets: Efficient Convolutional Neural Networks for Mobile Vision Applications," arXiv, Apr. 2017, 9 pages.
Huele et al., "Speed/accuracy trade-offs for modern convolutional object," arXiv, Apr. 2017, 21 pages.
Kumar et al., "Learning Local Image Descriptors with Deep Siamese and Triplet Convolutional Networks by Minimizing Global Loss Functions," Proceedings of the IEEE Conference on Computer Vision and Pattern Recognition, Aug. 2016, 10 pages.
PCT International Preliminary Report on Patentability in International Application No. PCT/US2017/062222, dated Oct. 7, 2019, 9 pages.
PCT International Search Report and Written Opinion in International Appln. No. PCT/US2017/062222, dated Mar. 26, 2018, 18 pages.
Schroff et al., "FaceNet: A Unified Embedding for Face Recognition and Clustering," Proceedings of the IEEE conference on computer vision and pattern recognition, Jun. 2015, 9 pages.
Shankar et al., "Deep Learning based Large Scale Visual Recommendation and Search for E-Commerce," arXiv, Mar. 2017, 9 pages.
Song et al., "Learning Unified Embedding for Apparel Recognition," Proceedings of the IEEE International Conference on Computer Vision, Oct. 2017, 4 pages.
Machine Translated Chinese Search Report Corresponding to Application No. 2017800894839 on Nov. 25, 2022.

* cited by examiner

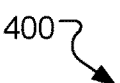

400

DATA PROCESSING APPARATUS DETERMINES RESPECTIVE LEARNING TARGETS FOR EACH OF A PLURALITY OF OBJECT VERTICALS BASED ON TWO OR MORE EMBEDDING OUTPUTS OF THE NEURAL NETWORK    <u>402</u>

DATA PROCESSING APPARATUS TRAINS THE NEURAL NETWORK TO IDENTIFY DATA ASSOCIATED WITH EACH OF THE PLURALITY OF OBJECT VERTICALS BASED ON A FIRST LOSS FUNCTION, WHERE THE NEURAL NETWORK IS TRAINED USING THE RESPECTIVE LEARNING TARGETS    <u>404</u>

DATA PROCESSING APPARATUS GENERATES, USING THE TRAINED NEURAL NETWORK, A UNIFIED MACHINE LEARNING MODEL CONFIGURED TO IDENTIFY ITEMS THAT ARE INCLUDED IN THE DATA ASSOCIATED WITH EACH OF THE PLURALITY OF OBJECT VERTICALS    <u>406</u>

FIG. 4

LEARNING UNIFIED EMBEDDING

CROSS-REFERENCE TO RELATED APPLICATIONS

This application is a National Stage Application under 35 U.S.C. § 371 and claims the benefit of International Application No. PCT/US2017/062222, filed on Nov. 17, 2017, which claims priority to U.S. Provisional Application Ser. No. 62/533,535, filed on Jul. 17, 2017. Each of the disclosures of the foregoing applications is hereby incorporated by reference in its entirety.

BACKGROUND

This specification relates to training a unified neural network model.

Neural networks are machine learning models that employ one or more layers of operations to generate an output, e.g., a classification, for a received input. Some neural networks include one or more hidden layers in addition to an output layer. The output of each hidden layer is used as input to the next layer in the network, i.e., the next hidden layer or the output layer of the network. Some or all of the layers of the network generate an output from a received input in accordance with current values of a respective set of parameters.

Some neural networks include one or more convolutional neural network layers. Each convolutional neural network layer has an associated set of kernels. Each kernel includes values established by a neural network model created by a user. In some implementations, kernels identify particular image contours, shapes, or colors. Kernels can be represented as a matrix structure of weight inputs. Each convolutional layer can also process a set of activation inputs. The set of activation inputs can also be represented as a matrix structure.

SUMMARY

This specification describes systems and methods for generating a unified machine learning model using a neural network on a data processing apparatus. According to the described technologies, a data processing apparatus determines a learning target for each object vertical in a group of object verticals. The data processing apparatus can determine each learning target based on two or more embedding outputs of the neural network. Each embedding output may be generated by separate specialized models that are individually trained using a triplet loss function. Each specialized model is configured to identify data associated with a particular object vertical.

A unified machine learning model is generated when the data processing apparatus trains a neural network to identify data associated with each object vertical in the group. The data processing apparatus trains the neural network based on an L2-loss function and using the respective learning targets of the specialized models. The data processing apparatus uses the trained neural network to generate a unified machine learning model. The unified model can be configured to identify particular electronic data items that include object representations of items that are in each of the object verticals.

One aspect of the subject matter described in this specification can be embodied in a computer-implemented method for generating a unified machine learning computing model using a neural network on a data processing apparatus. The method includes: determining, by the data processing apparatus and for the neural network, respective learning targets for each of a plurality of object verticals, wherein each object vertical defines a distinct category for an object that belongs to the vertical; training, by the data processing apparatus and based on a first loss function, the neural network to identify data associated with each of the plurality of object verticals, where the neural network is trained using the respective learning targets; and generating, by the data processing apparatus and using the neural network trained based on the first loss function, a unified machine learning model configured to identify items that are included in the data associated with each of the plurality of object verticals.

These and other implementations can each optionally include one or more of the following features. For example, in some implementations, determining respective learning targets for the neural network further includes: training, by the data processing apparatus and based on a second loss function, at least one other neural network to identify data associated with each of the plurality of object verticals; in response to training, generating, by the data processing apparatus, two or more embedding outputs, where each embedding output indicates a particular learning target and includes a vector of parameters that correspond to the data associated with a particular object vertical; and generating, by the data processing apparatus and using the at least one other neural network trained based on the second loss function, respective machine learning models, each machine learning model being configured to use a particular embedding output.

In some implementations, determining respective learning targets for the neural network further includes: providing, for training the neural network, the respective learning targets generated from respective separate models. In some implementations, each of the plurality of object verticals corresponds to a particular category of items and the data associated with each of the plurality of object verticals includes image data of an item in the particular category of items. In some implementations, the particular category is an apparel category and items of the particular category include at least one of: handbags, shoes, dresses, pants, or outerwear; and wherein the image data indicates an image of at least one of: a particular handbag, a particular shoe, a particular dress, a particular pant, or particular outerwear.

In some implementations, each of the respective machine learning models are configured to identify data associated with a particular object vertical and within a first degree of accuracy; and the unified machine learning model is configured to identify data associated with each of the plurality of object verticals and within a second degree of that exceeds the first degree of accuracy. In some implementations, determining the respective learning targets for each of the plurality of object verticals, includes: analyzing the two or more embedding outputs, each embedding output corresponding to a particular object vertical of the plurality of object verticals; and based on the analyzing, determining the respective learning targets for each of the plurality of object verticals.

In some implementations, the first loss function is an L2-loss function and generating the unified machine learning model includes: generating a particular unified machine learning model that minimizes a computational output associated with the L2-loss function. In some implementations, the neural network includes a plurality of neural network layers that receive multiple layer inputs, and where training the neural network based on the first loss function includes: performing batch normalization to normalize layer inputs to a particular neural network layer; and minimizing covariate shift in response to performing the batch normalization. In some implementations, the second loss function is a triplet loss function and generating the respective machine learning models includes: generating a particular machine learning model based on associations between an anchor image, a positive image, and a negative image.

Other implementations of this and other aspects include corresponding systems, apparatus, and computer programs, configured to perform the actions of the methods, encoded on computer storage devices. A computing system of one or more computers or circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments to realize one or more of the following advantages. Object recognition has received increased attention in vision research. In this context, the described teachings include processes for using a neural network to generate a unified machine learning model using an L2-loss function, where the unified model can be used to identify or recognize a variety of objects for multiple object verticals (e.g., dresses, handbags, shoes).

For example, given image data depicting representations of a piece of garment, the unified model generated according to the described teachings can be used to locate or retrieve the same or similar items. In some instances, an item's appearance can change with lighting, viewpoints, occlusion, and background conditions. Distinct object verticals can also have different characteristics such that images from a dress vertical may undergo more deformations than those from a shoe vertical. Hence, because of these distinctions, separate models are trained to identify items in each object vertical.

However, separate specialized models require substantial resources for model storage and added computational demands to support deployment of multiple models. These resource burdens may become more severe when multiple models are used on mobile platforms. Hence, a unified model for object recognition across different apparel verticals can reduce processor utilization and provide increases in computing efficiency of an example object recognition system. Moreover, object retrieval functions can be performed efficiently by combining multiple specialized models in a single unified model that uses a smaller computational footprint. This results in a technological improvement in the technological area of model generation and use.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 4 is an example flow diagram of a process for generating a unified machine learning model for multiple object verticals based on a particular loss function.

Like reference numbers and designations in the various drawings indicate like elements.

DETAILED DESCRIPTION

Figure 1:
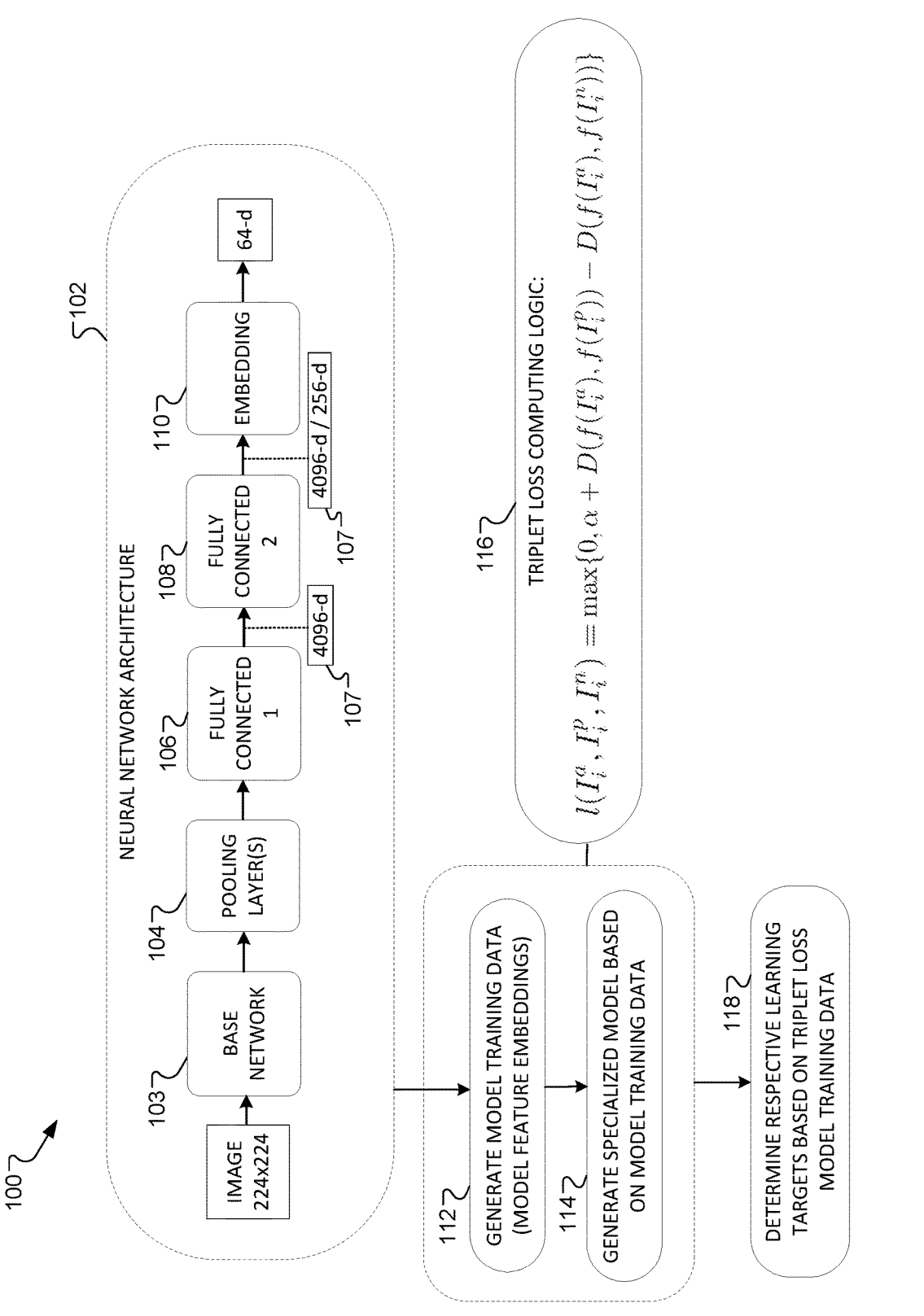
FIG. 1 illustrates a neural network architecture for generating a machine learning model based on a first loss function.

Machine learning systems can be trained, using deep neural networks, to recognize particular categories of items based on learned inferences. Deep neural networks can generate inferences based on analysis of input data received by the machine learning system. Trained machine learning systems may produce or generate one or more specialized models that use particular sets of learned inferences for identification or recognition of particular categories of items.

For example, in the context of apparel recognition, specialized models can be trained to recognize items associated with a particular category or object vertical, such as dresses, pants, or handbags in image data to which the model is applied. In alternative implementations, a category or object vertical can correspond to a variety of items or objects, such as automobiles, animals, human individuals, and various physicals objects, for example represented in image data. In some implementations, object vertical can correspond to audio signal data.

In general, specialized models may significantly outperform general models, e.g., models that are trained to recognize items associated with a wide range of object verticals. Therefore, item recognition models, generated using deep neural networks, are often trained separately for different object verticals. An object vertical defines a distinct category for an object that belongs to the vertical, e.g., for apparel, object verticals may be the item categories of hats, shoes, shirts, jackets, etc.). However, an item recognition system that includes groups of specialized models for identifying items of different object verticals can be expensive to deploy and may not be sufficiently scalable.

In this context, the subject matter described in this specification includes systems and methods for generating a unified machine learning model using a neural network on a data processing apparatus. The unified embedding model can be generated using a deep neural network that utilizes learning targets indicated by embedding outputs generated by respective specialized models. The neural network (or deep neural network) can be used by an example machine learning system to learn inferences for identifying a variety of items across multiple object verticals, e.g., item categories corresponding to various apparel classes.

For example, a machine learning system that includes a neural network can access respective learning targets for each object vertical in a group of object verticals. The system can determine the respective learning targets based on two or more embedding outputs of the neural network. Each embedding output can be generated by respective specialized models that are individually trained using a triplet loss function and to identify data (e.g., an image of a luxury handbag) associated with a particular object vertical (e.g., handbags).

The data processing apparatus of the system trains the neural network to identify data associated with each vertical in the group of object verticals. The neural network can be trained using the respective learning targets of the specialized models and based on an L2-loss function. The data processing apparatus uses the trained neural network to generate a unified machine learning model configured to identify particular data items (e.g., Brand name sneakers, Luxury purse, Luxury blouse, etc.) associated with each object verticals in the group (e.g., shoes, handbags, tops/ shirts, etc.).

FIG. 1 illustrates a neural network system architecture 100 ("system 100") for generating an example machine learning model based on a first loss function. Generating a machine learning model can include system 100 performing neural network computations associated with inference workloads. In particular, computations for inference workloads can include processing neural network inputs (e.g., input activations) through layers of a neural network. Each layer of a neural network can include a set of parameters (e.g., weights) and processing an input through a neural network layer can include computing dot products using the input activations and parameters as operands for the computations.

System 100 generally includes an example neural network indicated by neural net architecture 102. A neural network of architecture 102 can include a base network 103, a pooling layer 104, a first connected layer set 106, a second connected layer set 108, and embedding outputs 110. Base network 103 can include a subset of neural network layers of architecture 102.

For example, a deep neural network can include a base network 103 that includes multiple convolutional layers. These convolutional layers can be used to perform complex computations for computer based recognition of various items included in a variety of image data. In some implementations, base network 103 can be inception v2, an inception v3, an inception v4, or another related neural net structure. Although described in the context of image data, the processes of this specification can be applied to detection or recognition of audio signal data.

Architecture 102 can include a variety of additional neural network layers that perform various functions associated with inference computations for training a machine learning model. For example, pooling layer 104 can be an average pooling layer or max pooling layer that perform functions related to pooling output activations for down-sampling operations. The down-sampling operations can reduce a size of output datasets by modifying certain spatial dimensions that relate to an input dataset.

Connected layer sets 106, 108 can be respective sets of fully connected layers that include artificial neurons that have full connections to all activations in a previous layer. Embedding outputs 110 can correspond to one or more output feature sets that include a vector of floats/parameters for given output dimension (64-d, 256-d, etc.). As described in more detail below, embedding outputs 110 are formed, produced, or generated, when the example neural network of system 100 is trained to perform certain computational functions for object/item recognition or identification.

System 100 can include one or more processors and other related circuit components that form one or more neural networks. In general, methods and processes described in this specification can be implemented using a variety of processor architectures, such as Central Processing Units (CPUs), Graphics Processing Units (GPUs), digital signal processors (DSPs), or other related processor architectures.

System 100 can include multiple computers, computing servers, and other computing devices that each include processors and memory that stores compute logic or software instructions that are executable by the processors. In some implementations, system 100 includes one or more processors, memory, and data storage devices that collectively form one or more architecture 102. Processors of architecture 102 process instructions for execution by system 100, including instructions stored in the memory or on the storage devices. Execution of the stored instructions can cause performance of the machine learning processes described herein.

Referring again to FIG. 1, system 100 is configured to perform a variety of computing operations related to machine learning processes. For example, system 100 performs learning operations 112 and 114 as well as a variety of other operations related to training a neural network to generate one or more specialized machine learning models. In some implementations, system 100 executes programmed code or software instructions to perform computations associated with learning operations 112 and 114. As described in more detail below, learning operations 112 and 114 are executed by system 100 to train respective specialized learning models based on a triplet loss function indicated by computing logic 116.

Learning operation 112 includes system 100 using the neural network of architecture 102 to generate model training data. The model training data can correspond to embedding outputs that are produced by system 100 when the system is trained to generate a particular specialized model. In some implementations, system 100 generates multiple distinct specialized models and produces individual sets of embedding outputs, where a particular set of embedding outputs corresponds to a particular specialized model.

For example, in the context of apparel recognition or apparel retrieval, separate specialized models can be generated to recognize and retrieve apparel items for different apparel categories (e.g., dresses, tops, handbags, etc.). In some implementations, embedding models for recognizing images from various websites or other user produced images (e.g., "street" or "real life" digital images captured using mobile devices/smartphones) can be learned using separate sub-networks.

During model training, a sub-network for each vertical such as dresses, handbags, eyewear, and pants can be fine-tuned independently. For these sub-networks, the results of the model training can enable a machine learning system to produce up to eleven separate specialized models that each correspond to one of eleven verticals. As used herein, a "vertical" or "object vertical" corresponds to an object or item category. For apparel recognition, an object vertical can be an apparel item category such as dresses, handbags, eyewear, pants, etc. As discussed in more detail below, using separate models for object recognition of items (e.g., apparel items) in a particular category/vertical can result in substantially accurate item recognition results.

In some implementations, system 100 trains a neural network of architecture 102 using image data for apparel items that are each associated with different apparel categories. For example, system 100 can use image data for multiple different types of handbags to train the neural network. System 100 can then generate a specialized model to identify or recognize particular types of handbags based on embedding outputs that are produced in response to training the neural network.

As indicated above, a particular set of embedding outputs can correspond to a particular specialized model. For example, in apparel recognition, a first set of embedding outputs can correspond to neural network training data for learned inferences used to generate a first model for recognizing certain shirts/blouses or tops (e.g., see operation 114). Similarly, a second set of embedding outputs can correspond to neural network training data for learned inferences used to generate a second model for recognizing certain jeans/ pants/skirts or bottoms.

Each set of embedding outputs include embedding feature vectors that can be extracted and used for object or item retrieval. As described in more detail below, extracted sets of embedding feature vectors can correspond to respective learning targets and an embedding output of a trained neural network model can include these embedding feature vectors.

One or more learning targets can be used to train a machine learning system (e.g., system 100) to generate particular types of specialized computing models. For example, as discussed below with reference to features of FIG. 2, multiple distinct learning targets can be used to train at least one unified machine learning model that recognizes items that are associated with multiple different verticals or categories.

Referring again to FIG. 1, system 100 executes learning operation 114 to generate specialized learning models based on model training data determined at learning operation 112. In some instances, determining or generating model training data corresponds to an example process of "learning" individual embedding models. In some implementations, for model training and feature vector extraction, system 100 uses a two-stage approach when training (e.g., a first stage) and when extracting embedding feature vectors for object retrieval (e.g., a second stage).

In the context of apparel retrieval from image data, the first stage can include localizing and classifying an apparel item of the image data. In some instances, classifying an apparel item of the image data includes system 100 determining an object class label for the apparel item of the image data. For example, system 100 can use an example object detector to analyze the image data. System 100 can then use the analysis data to detect an object or apparel item of the image data that includes object attributes that are associated with handbags. Based on this analysis and detection, system 100 can then determine that the object class label for the apparel item is a "handbag" class label.

In some implementations, system 100 includes object detection architecture that is a single-shot multi-box (SSD) detector for a base network 103 that is an inception V2 base network. In other implementations, system 100 can be configured to use or include a variety of other object detection architectures and base network combinations. The SSD can be an example computing module of system 100 that executes program code to cause performance of one or more object detection functions.

For example, this SSD detector module can provide bounding boxes that bound an object of the image data. The SSD can further provide apparel class labels that indicate whether the bounded object is a handbag, an eyewear item, or a dress. In some implementations, object pixels of the image data can be cropped and various features can then be extracted on the cropped image using a particular embedding model of system 100. Sub-process steps associated with the first stage of the two-stage process can be used to train a specialized embedding model based on a variety of image data.

In response to determining an object class label at the first stage, system 100 can proceed to the second stage and train specialized embedding models to compute similarity features for object retrieval. For example, system 100 can perform embedding model training using a triplet loss function indicated by computing logic 116. More specifically, system 100 uses triplet ranking loss to learn feature embeddings for each individual item/object vertical or category.

For example, a triplet includes an anchor image, a positive image, and a negative image. During triplet learning, system 100 seeks to produce embeddings such that the positive image gets close to the anchor image while the negative is pushed away from the anchor image in a feature space of the neural network. Embeddings learned from triplet training are used to compute image similarity.

For example, let $$t_i = (I_i^a, I_i^p I_i^n)$$

be a triplet, where $$I_i^a, I_i^p, I_i^n$$

represent the anchor image, positive image and negative image respectively. A learning goal of system 100 is to minimize a computational output associated with the following loss function shown as equation (1), $$l(I_i^a, I_i^p, I_i^n) = \max\{0, \alpha + D(f(I_i^a), f(I_i^p)) - D(f(I_i^a), f(I_i^n))\} \quad (1)$$

where: i) $\alpha$ is the margin enforced between the positive and negative pairs, ii) $f(I)$ is the feature embedding for image I, and iii) $D(f_x, f_y)$ is the distance between the two feature embeddings $f_x$ and $f_y$.

For implementations that involve training separate models for particular apparel object verticals, a positive image is the same product (e.g., Chanel handbag) as the anchor image, while the negative image is of another product but in the same apparel vertical (e.g., Luxury handbag). In some implementations, system 100 executes computing logic for semi-hard negative mining functions for obtaining negative image data. For example, system 100 can access online/ web-based resources and use semi-hard negative mining to identify strong negative object images. System 100 can then use these object images to enhance or improve effectiveness of the training for a particular specialized model.

As indicated above, model training based on the triplet loss function of logic 116 produces training data such as embedding outputs that include feature vectors. Extracted sets of embedding feature vectors can correspond to respective learning targets. Hence, at learning operation 118, system 100 can determine respective learning targets based on the triplet loss model training data. System 100 can then use two or more of the learning targets to train a machine learning system (e.g., system 200 of FIG. 2) to generate at least one unified computing model, as described below.

Figure 2:
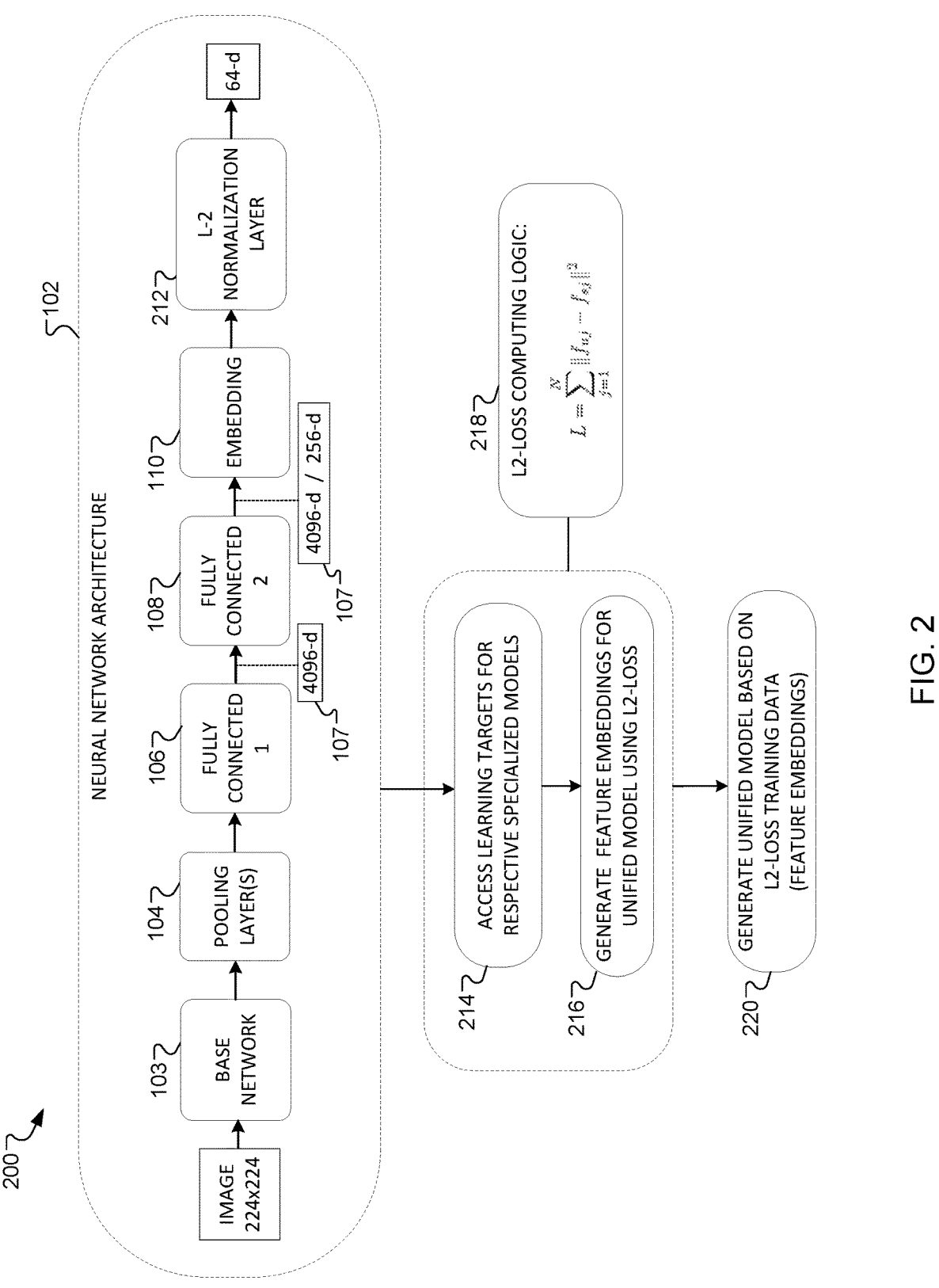
FIG. 2 illustrates a neural network architecture for generating a machine learning model based on a second loss function.

FIG. 2 illustrates a neural network system architecture 200 ("system 200") for generating an example machine learning model based on a second loss function, e.g., an L2-loss function. As shown, system 200 includes substantially the same features as system 100 described above. However, system 200 includes an L2 normalization layer 212 that is described in more detail below. In some implementations, system 200 is a sub-system of system 100 and can be configured to execute the various computing functions of system 100 described above.

System 200 is configured to learn or generate a unified embedding model that is trained based on learned inferences. These learned inferences enable object recognition of various item groupings, where each grouping corresponds to distinct object verticals or categories (e.g., apparel categories). System 200 learns one or more unified models by combining training data produced when system 100 is used to train respective specialized models as described above. In some related model learning/training scenarios, combining training data from separate models to generate a unified model can cause performance degradation when triplet loss is used to train the unified model.

For example, using the triplet loss function of logic 118 to train a unified model based on combined training data (e.g., embedding outputs 112) of the different object verticals can lead to significant drops in recognition accuracy compared to the accuracy of models trained for each individual vertical. These decreases can occur as more object categories (or verticals) are accumulated into a single unified model. However, as described in more detail below, when combining embeddings from multiple specialized model to generate a single unified model, reducing training difficulty and training complexity can lead to substantial improvements in performance and recognition accuracy.

According to the described teachings, system 200 can generate a unified embedding model that achieves equivalent performance and recognition accuracy when compared to individual specialized models. Further, the unified model can have the same, or even less, model complexity as a single individual specialized model. Hence, this specification describes improved processes and methods for easing or reducing the difficulties in training model embeddings for multiple verticals such that a unified model can be generated.

For example, separate specialized models can be first trained to achieve a desired threshold level of accuracy for recognizing objects included in image data. As indicated above, the separate models can be trained using system 100 and based on the triplet loss function of computing logic 118. Embedding outputs of each separately trained model are then used as the learning targets to train an example unified model.

In some implementations, a particular specialized model can have an example accuracy metric of 0.66, where the model accurately identifies certain handbags 66.1% (66.1) of the time. A unified model generated according to the described teachings can achieve accurate object recognition results that exceed an accuracy metric of the objection results of the particular specialized model (e.g., 66.1). For example, in the context of apparel recognition, a unified model generated according to the described teachings can have an object retrieval or recognition accuracy of 0.723 accuracy metric, or 72.3 percent accuracy, for a handbags apparel category.

In some implementations, accurately recognizing/identifying an object using the unified model includes determining a category of the object (e.g., "handbag"), determining an owner or designer of the object (e.g., "Chanel" or "Gucci"), and/or determining a type/style of the handbag (e.g., "Chanel 2.55 classic flap bag"). In some instances, identifying an object by the unified model an include the model retrieving (e.g., object retrieval) associated image data that includes a graphical representation of the object.

Referring again to FIG. 2, system 200 is configured to generate a unified model that can execute multiple tasks for accurate object recognition and retrieval that, in prior systems, are performed by separated models but with reduced accuracy. Moreover, the described teachings include methods and processes for improvements in emulating separate model embeddings outputs (e.g., learning targets) through use of an L2 loss function.

For example, training a unified model based on triplet loss and by combining training data for two different object verticals (e.g., handbags and shoes) can generate a unified model that performs object recognition of items in those verticals with reasonable accuracy. However, using triplet loss when combining training data for three or more different object verticals may result in a unified model that performs with substantially poor object recognition accuracy. The poor accuracy results from difficult and complex computing challenges that occur when training a unified model based on a triplet loss function for several distinct verticals.

To ease this training difficulty, this specification proposes a learning scheme that uses embedding outputs from specialized models as learning targets such that L2-loss can be used instead of triplet loss. Use of the L2-loss function eases the training difficult with generating the unified model and provides for more efficient use of a neural network's feature space. The end result is a unified model that can achieve the same (or greater) retrieval accuracy as a number of separate specialized models, while having the model complexity of a single specialized model.

For example, system 200 uses the respective learning targets of the separate models to learn a unified learning model such that embeddings generated from this unified model are the same as (or very close to) the embeddings of separate specialized models generated by system 100. In some implementations, system 200 uses a neural network of architecture 102 to determine respective learning targets for each object vertical in a group of object verticals. Each of the respective learning targets can be based on a particular embedding output of the neural network.

FIG. 2 shows computing operations for generating a unified machine learning model. For example, at learning operation 214 of FIG. 2, system 200 accesses learning targets that correspond to feature embeddings for the respective specialized models. At learning operation 216, system 200 generates unified model training data that correspond to feature embeddings for detecting objects of various verticals. The feature embeddings are based on neural network inference computations that occur during unified model learning.

For example, let $$V = \{V_i\}_{i=1}^{K},$$

where each $V_i$ is a set of verticals whose data can be combined to train an embedding model. Let $$M = \{M_i\}_{i=1}^{K}$$

be a set of embedding models, where each $M_i$ is the model learned for vertical set $V_i$. Let $$I = \{I_j\}_{j=1}^{K}$$

be a set of N training images. If the vertical-of-$I_j \in V_s$, s=1 . . . K, its corresponding model $M_s$ is used to generate embedding features for image $I_j$. Let $f_{sj}$ denote the feature embeddings generated from $M_s$ for image $I_j$.

At learning operation 220, system 200 generates a unified machine learning model configured to identify particular items included in example image data. The image data can be associated with each object vertical of the group and the unified model is generated using a neural network trained based on a particular loss function (e.g., L2-loss). For example, system 200 is configured to learn a model U, such that the features produced from model U are the same as features produced from the separate specialized models generated by system 100.

In particular, let $f_{uj}$ denote the feature embeddings generated from model U. A learning goal of system 200 is to determine a model U which can minimize a computational output associated with the following loss function shown as equation (2).

$$L = \sum_{j=1}^{N} \| f_{uj} - f_{sj} \|^2 \qquad (2)$$

With reference to equation (2), features $f_{uj}$ are computed from model U, while features $f_{sj}$ can be computed from the different specialized models described above. The above model learning description uses the L2-loss function indicated by computing logic 218 and equation (2) above, instead of the triplet loss function indicated by computing logic 116 and equation (1) above.

In some implementations, system 200 is configured to generate a unified model that has an output dimension 107 that is 256-d. In contrast, a single specialized model generated at learning operation 114 can have an output dimension 107, e.g., 4096-d, that is larger than, or substantially larger than, the 256-d output dimension of the unified model. As noted above, use of L2-loss provides for a less complex and less difficult training process than triplet loss.

Additionally, use of the L2-loss function provides for less complexity and difficulty in the application of learning techniques, such as batch normalization. For example, with batch normalization, neural network layer inputs can be normalized to allow for higher learning rates. For an example image classification model, batch normalization can be used to achieve desired threshold accuracy metrics (e.g., 0.60 or higher) with fewer training steps when compared to learning techniques used with other loss functions.

In some implementations, covariate shift can be minimized in response to system 200 performing batch normalization functions that are applied via L2 normalization layer 212. For example, deep neural networks can include multiple layers in a sequence. Training deep neural networks is often complicated by the fact that a distribution of each layer's inputs can change during model training, for example, as parameters of previous layers in a sequence change.

Such changes can slow down a speed with which a model can be trained using a deep neural network, thereby requiring slower learning rates and careful parameter initialization. Parameter changes that adversely affect training speed can be described as neural network internal covariate shift. However, by using L2-loss, batch normalization processes for normalizing layer inputs can be performed to resolve or minimize adverse effects on training speed that are caused by covariate shift.

Further, a learning approach that uses L2-loss to generate a unified model allows for the use of increased amounts of unlabeled data relative to triplet loss. For example, with the triplet loss learning approach for training apparel recognition models, a product identity (e.g. "Chanel 2.55 classic flap bag") can be required to generate embeddings data for the training triplet. However, a model training and learning approach that uses L2-loss requires only the vertical labels, which can be generated automatically by an example localization/classification model. Hence, use of L2-loss can reduce processor utilization and increase system bandwidth for additional computations by foregoing computations for determining product identities.

Alternatively, the described teachings also include methods for selecting vertical data combinations for producing a particular model (e.g., a unified model or other related combined model forms) that can be used to reduce a number of specialized models. This particular combined model can be successfully learned and can have a comparable object recognition accuracy that is similar to, the same as, or greater than the recognition accuracy of each separate specialized model.

For example, selective or "smart" vertical combination can be used to determine a combined model (e.g., an example unified model). In some implementations, system 200 can include computing logic for determining which embeddings data from different verticals for specialized models can be combined to produce an example combined model. In particular, starting with a first vertical, system 200 can progressively add embeddings data from other verticals. While adding embeddings data, system 200 can perform sample item recognition tasks to determine whether a model learned from the combined data causes observed accuracy degradation.

In some instances, system 200 can steadily add embeddings data from other verticals until accuracy degradation is observed. In other instances, system 200 determines a particular combination of verticals for a number of specialized models, where each specialized model is used for item recognition across a subset of verticals. Further, system 200 can determine a particular combination of verticals for a number of specialized models while also maintaining a threshold level of accuracy. System 200 can then use feature embeddings for specialized models that correspond to particular verticals in the subset and produce a combined model based on the feature embeddings.

Figure 3:
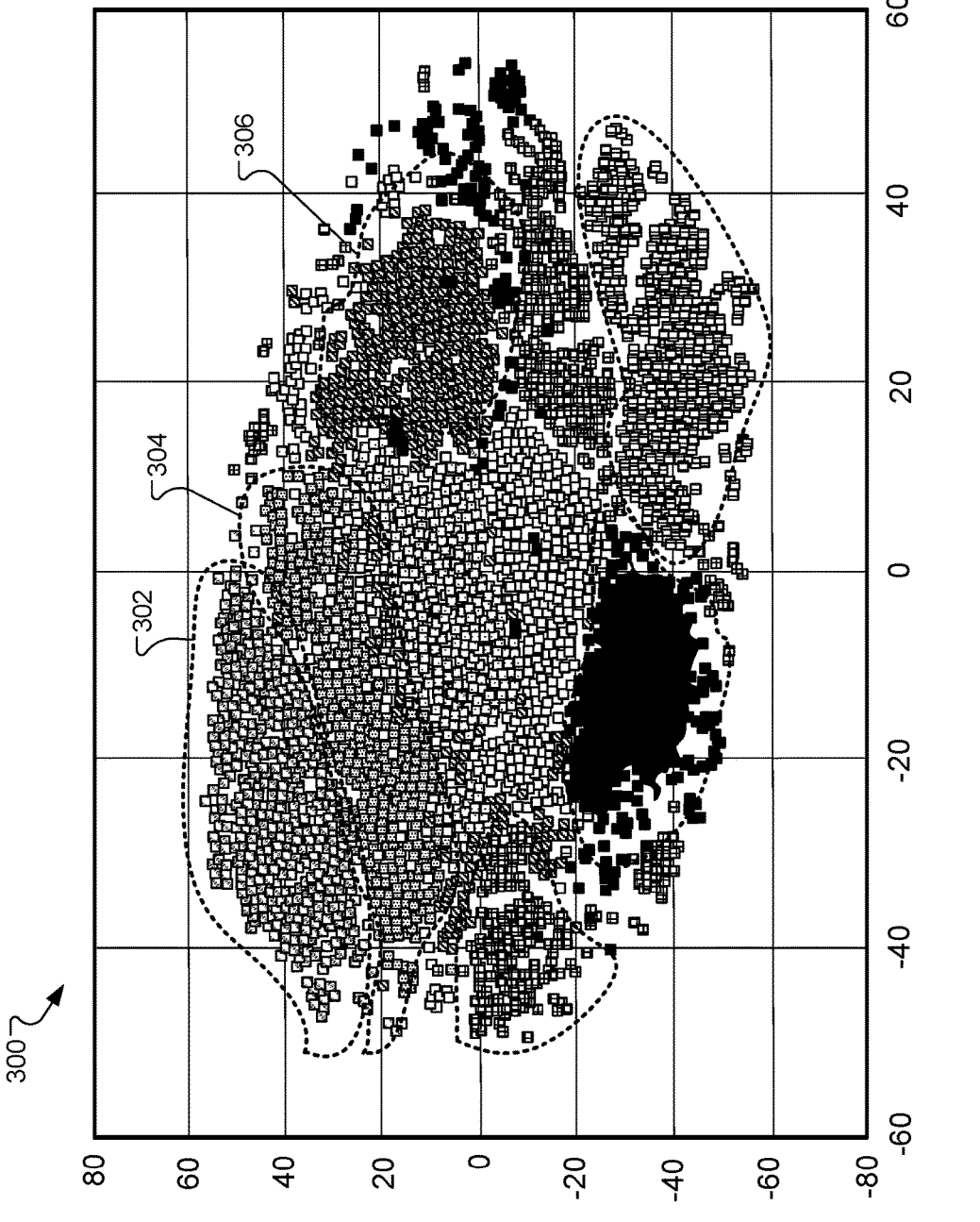
FIG. 3 illustrates example graphical representations of embedding data relating to different object verticals.

FIG. 3 shows graphical representations of embeddings data 300 for different object verticals in a feature space of an example neural network. The graphical representations generally indicate that a unified model trained (e.g., learned) based on the described teachings can provide more efficient and broader use of a feature space of the neural network. For example, the described learning approach that uses L2-loss can efficiently train a unified model by taking advantage of pre-established feature mappings (e.g., learning targets) learned for separate specialized models.

Embeddings data 300 includes t-distributed stochastic neighbor embedding (t-SNE) visualizations generated from feature embeddings of separate specialized models. In particular, embeddings data 300 includes two thousand images from each vertical 302, 304, and 306, where the data is projected down to 2D space for visualization.

FIG. 3 indicates that the feature embeddings $f_{sj}$ are separated across verticals 302, 304, 306 in the feature space. In other words, an embedding model for each vertical $f_{sj}$ (from model $M_s$) uses only a part of the dimensional space (e.g., 64-d), and therefore one unified model can be learned to combine embeddings outputs for each apparel vertical included in embedding of data 300 (e.g., 8 total verticals).

FIG. 4 is an example flow diagram of a process for generating a unified machine learning model for multiple object verticals based on a particular loss function. Process 400 corresponds to an improved process for generating unified machine learning models, where the generated models have item recognition accuracy metrics that are at least equal to an accuracy metric of two or more distinct specialized models. Process 400 can be implemented using system 100 or 200 described above, where system 100 can perform all described functionality associated with sub-system 200.

Process 400 includes block 402 where system 100 determines respective learning targets for each object vertical in a group of object verticals. In some implementations, a neural network of system 100 determines respective learning targets based on two or more embedding outputs of the neural network.

For example, the object verticals can be apparel categories, such as a dresses, shoes, or handbags. Further, each vertical can correspond to an embedding output that is produced when a particular model is trained to identify or recognize apparel or clothing items in a vertical. Example apparel items can include cocktail dresses, basketball sneakers, or brand name monogram handbags.

At block 404 of process 400, system 100 trains the neural network to identify data associated with each object vertical in the group based on a first loss function (e.g., L2-loss). In some implementations, the neural network is trained using the respective learning targets that were determined for each object vertical. For example, given an image file or image data, system 100 can train the neural network to at least: i) identify a dress item in an image based on analysis of pixel data of the image; ii) identify a shoe item in an image based on analysis of pixel data of the image; or iii) identify a handbag item in an image based on analysis of pixel data of the image.

At block 406, system 100 generates, a unified machine learning model that is configured to identify items that are included in the data associated with each object vertical of the group of verticals. For example, data processing apparatus of system 100 can use the neural network trained based on the first loss function to generate the unified machine learning model that performs one or more of the object recognition functions described herein.

In some instances, determining the respective learning targets includes: i) training the neural network to identify data associated with each of the object verticals, where the neural network is trained based on a second loss function; and ii) generating at least two embedding outputs, where each embedding output indicates a particular learning target of the respective learning targets. In addition to indicating a particular learning target, each embedding output can include a vector of floats (or parameters) that correspond generally to attributes of the image data associated with a particular object vertical.

In some implementations, system 100 generates respective machine learning models, where each of the models are generated using the neural network trained based on the second loss function (e.g., triplet loss) that is different than the first loss function. Moreover, each of the models may use a vector of floats for a particular embedding output to identify apparel or clothing items for a particular object vertical. In some instances, generating the embeddings occurs in response to training the neural network.

As discussed above briefly with reference to FIG. 2, in some implementations, generating a unified machine learning model can include combining training data associated with different apparel verticals. To calibrate object identification and retrieval performance (e.g., determine learning targets), triplet loss is first used to learn embeddings for each vertical. A goal for vertical combination can be to use fewer numbers of individual specialized models, but without any observed retrieval accuracy degradation.

TABLE 1

| Comparison of retrieval accuracy (in percentage) for different vertical combinations | | | |
|---|---|---|---|
| Method | Dresses | Tops | Outerwear |
| Individual Model | 48.6 | 24.8 | 22.0 |
| Dress-Top joint model | 48.9 | 27.55 | 16.3 |
| Dress-Top-Outerwear joint model | 37.0 | 19.9 | 17.9 |

Table 1 shows examples of retrieval accuracy metrics of an (1) individual model, (2) dress-top joint, or combined, model, and (3) dress-top-outerwear joint model, on verticals for "dresses", "tops", and "outerwear." Compared to the individual model, the dress-top joint model performances are very similarly or slightly better on "dresses" and "tops", however, the dress-top joint model does poorly with regard to retrieval accuracy of apparel items in the "outerwear" vertical category.

Further, a dress-top-outerwear joint model can cause significant accuracy degradation on all three verticals. Accuracy data of Table 1 indicates that some verticals can be combined to achieve better accuracy than individually trained models, but only to a certain extent, after which model training difficulties of the triplet loss function causes accuracy degradation (described above).

An example process of system 100, 200 can include combining different verticals of training data. In particular, nine apparel verticals can be combined into four groups, where one combined model is trained for each group. In some instances, more or fewer than nine apparel verticals can be combined into a particular number of groups based on user requirements.

TABLE 2

| Vertical combination groups Groups of Verticals |
|---|
| dresses, tops |
| footwear, handbags, eyewear |
| outerwear |
| skirts, shorts, pants |

The four groups are shown in Table 2 and can have comparable performance retrieval accuracy as the individually trained models of each group. In some implementations, "clean triplets" are used to fine-tune each of the four models, where the clean triplets are obtained from "image search" triplets (described below). For example, system 200 can be configured to fine-tune model performance using the clean data to accomplish effective improvements in retrieval accuracy for each of the four models.

In general, by combining training data, four embedding models can be obtained for nine distinct apparel verticals. A unified model for all nine verticals can be trained, or learned, and then generated based on the above described teachings. In some implementations, a generated model is deployed for operational use by multiple users. For example, the unified model can receive image data transmitted by a user, where the user seeks to obtain identifying data about a particular object or apparel item included in an image.

In some implementations, the unified model is configured to receive image data for an image, identify or recognize an apparel item in the image, and determine identifying information about the apparel item in the image. In some instances, the unified model is configured to retrieve a related image of the apparel item, and provide, for output to the user via a mobile device, identifying information about the apparel item and/or the related image of the apparel item.

Figures 5, 6:
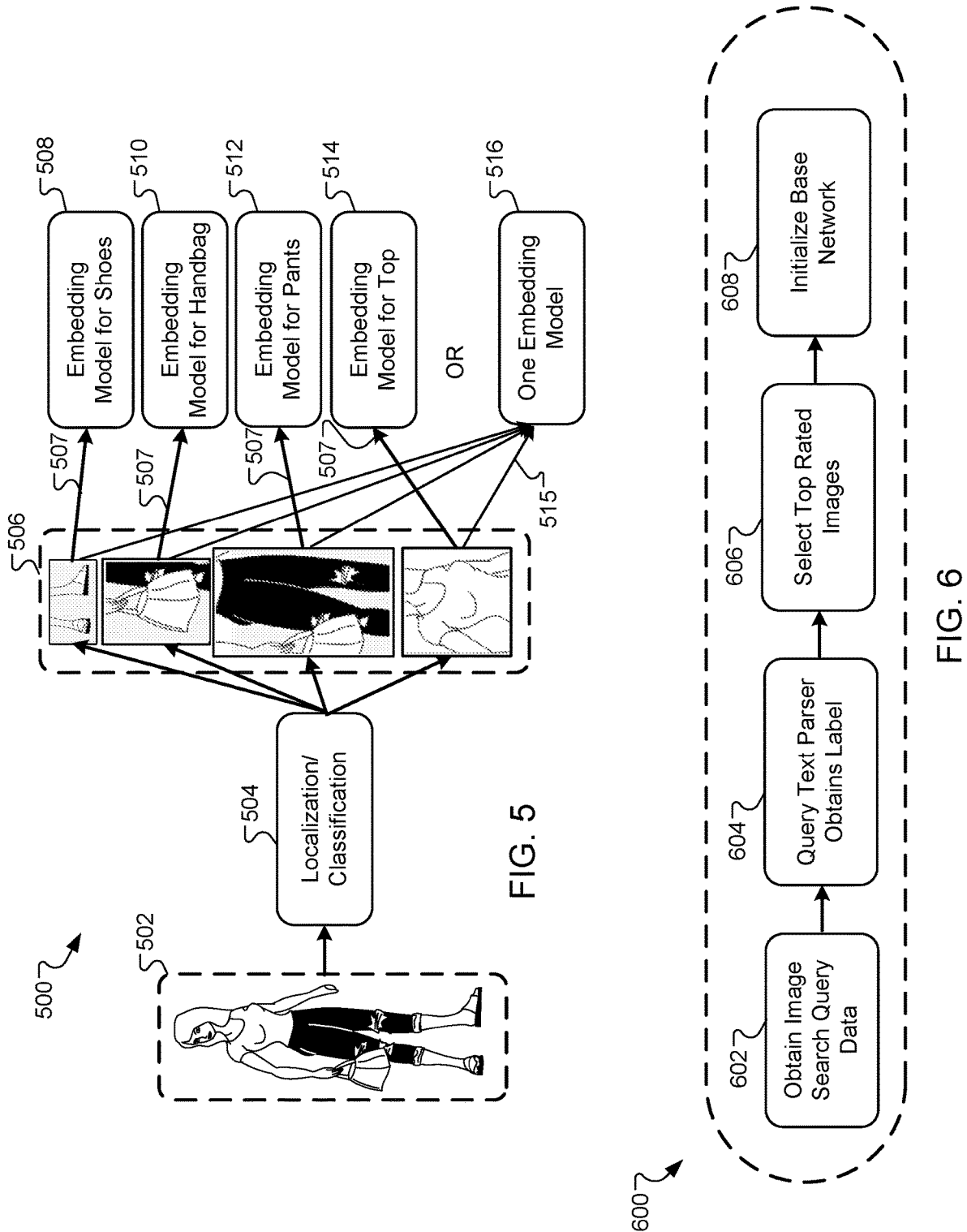
FIG. 5 illustrates a diagram that includes graphical representations of respective embedding models for object verticals that correspond to a particular apparel category.
FIG. 6 illustrates a diagram that with computing functions for obtaining image data for training one or more machine learning models.

FIG. 5 shows a diagram 500 that includes graphical representations of respective embedding models for object verticals that correspond to a particular apparel category. Moreover, the depictions of diagram 500 can correspond to a process, executable by system 100, 200, for extracting one or more feature embeddings. As described above, in the context of apparel recognition, an example two-stage approach can be used for extracting feature embeddings associated with image data of an item or apparel object.

As shown in diagram 500, for a given image/image data 502, at block 504 a clothing item can be first detected and localized in the image. At block 506, an embedding (e.g., a vector of floats) is then obtained from a cropped image to represent the clothing item. The embedding is used by the system 100, 200 to compare a similarity image for item/ object retrieval. In some implementations, the embedding obtained from the cropped image can correspond to a learning target for an apparel vertical to which the clothing item belongs.

As shown by respective arrows 507, each embedding model 508, 510, 512, and 514 corresponds to object retrieval functions for identifying and retrieving certain apparel items. The apparel items can correspond to items depicted in the particular cropped portions of image data. In contrast, arrow 515 indicates that uniform embedding model 516 corresponds to object retrieval functions for identifying and retrieving apparel items for objects depicted in each of the cropped portions of image data in block 506.

Block 506 includes respective cropped images that each include a representation of a clothing or apparel item for an object vertical category of the embedding model. For example, a first cropped image data that depicts a handbag corresponds to embedding model 510 for identifying and retrieving image data for handbags. Likewise, a second cropped image data that depicts pants corresponds to embedding model 512 for identifying and retrieving image data for pants. However, each cropped image data at block 506 corresponds to unified embedding model 516 for identifying and retrieving image data for various types of apparel items.

FIG. 6 shows an example diagram 600 including computing functions for obtaining image data for training one or more machine learning models. Diagram 600 can correspond to computing functions executable by one or more computing modules of system 100 or 200 described above.

At logic block 602, training data relating to images is first collected from search queries. The search queries can be accessed from an example search system that receives and stores large volumes of image search queries. For example, system 100 can be configured to access a query data storage device, such as privately owned query repository that stores thousands (e.g., 200,000) user queries submitted using Google Image Search. The search queries can include specific product or apparel item names.

At block 604, parsing logic for an example query text parser is executed by system 100 to obtain an apparel class label for each text query obtained from the query repository.

The text queries can be associated with nine distinct verticals: i) dresses, ii) tops, iii) footwear, iv) handbags, v) eyewear, vi) outerwear, vii) skirts, viii) shorts, and ix) pants. At block 606, system 100 selects a particular number of top rated images (e.g., 30 images) for each search query, where images are rated based on image pixel quality and an extent to which query text data accurately describes an apparel item of the image.

Image data of the top rated images can be used to form the "image search triplets" described above, where a triplet includes a positive image, a negative image, and an anchor image. System 100 can identify at least a subset of triplets (e.g., 20,000 triplets for each object vertical) for system or user rating and verification as to the correctness of each image in the triplet. In some implementations, rating and image verification includes determining whether an anchor image and a positive image of the triplet are from the same product/vertical category. Subsets of triplet images that are rated and verified as correct can be used to form a second set of triplets referred to herein as "clean triplets".

At logic block 608, prior to generating a unified model, base network 103 can be initialized from a model pre-trained using one or more types of image data (e.g., ImageNet data). In some implementations, when generating a unified embedding model, the same training data can be used for learning the unified embedding model as was used for triplet feature learning of two or more specialized models. For example, generating a unified embedding learning model may only require vertical label data, which can be obtained via a localizer/classifier, as described above. Hence, unified embedding learning can be generated using the same training images as the training images generated during triplet embedding learning.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer.

Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for generating a unified machine learning computing model using a neural network on a data processing apparatus, the method comprising:

determining, by the data processing apparatus and for the neural network, respective learning targets for each of a plurality of object verticals, wherein each object vertical defines a distinct category for an object that belongs to the vertical, wherein each distinct category comprises a particular object class, wherein each respective learning target comprises an embedding output generated by a respective specialized model of a plurality of specialized models, wherein the plurality of specialized models are individually trained, wherein the respective specialized model is associated with a particular object vertical of the plurality of object verticals, wherein each distinct specialized model of the plurality of specialized models was trained for a different object class;

training, by the data processing apparatus and based on a first loss function, the neural network to identify data associated with each of the plurality of object verticals, wherein the neural network is trained to generate one or more feature embeddings associated with the embedding output of the respective learning targets of a respective specialized model, wherein the first loss function differs from a second loss function, wherein the plurality of specialized models are trained with the second loss function, wherein training with the first loss function comprises:

training the neural network to generate one or more particular feature embeddings that emulate the embedding output of the respective specialized model associated with a particular object vertical associated with a subset of training data being processed by the neural network, wherein the respective specialized model differs based on the particular object vertical and the respective portion of training data; and generating, by the data processing apparatus and using the neural network trained based on the first loss function, a unified machine learning model configured to identify items that are included in the data associated with each of the plurality of object verticals.

2. The method of claim 1, wherein determining respective learning targets for the neural network further comprises:

training, by the data processing apparatus and based on the second loss function, at least one other neural network to identify data associated with each of the plurality of object verticals, in response to training, generating, by the data processing apparatus, two or more respective embedding outputs, where each respective embedding output indicates a particular learning target and includes a vector of parameters that correspond to the data associated with a particular object vertical; and generating, by the data processing apparatus and using the at least one other neural network trained based on the second loss function, respective machine learning models, each machine learning model being configured to use a particular embedding output.

3. The method of claim 2, wherein determining respective learning targets for the neural network further comprises:

providing, for training the neural network, the respective learning targets generated from respective separate models.

4. The method of claim 2, wherein each of the plurality of object verticals corresponds to particular category of items and the data associated with each of the plurality of object verticals includes image data of an item in the particular category of items.

5. The method of claim 4, wherein the particular category is an apparel category and items of the particular category include at least one of: handbags, shoes, dresses, pants, or outerwear; and wherein the image data indicates an image of at least one of: a particular handbag, a particular shoe, a particular dress, a particular pant, or particular outerwear.

6. The method of claim 5, wherein:

each of the respective machine learning models are configured to identify data associated with a particular object vertical and within a first degree of accuracy; and the unified machine learning model is configured to identify data associated with each of the plurality of object verticals and within a second degree of that exceeds the first degree of accuracy.

7. The method of claim 2, wherein determining the respective learning targets for each of the plurality of object verticals comprises:

analyzing the two or more respective embedding outputs, each respective embedding output corresponding to a particular object vertical of the plurality of object verticals; and based on the analyzing, determining the respective learning targets for each of the plurality of object verticals.

8. The method of claim 2, wherein the first loss function is an L2-loss function and generating the unified machine learning model includes:

generating a particular unified machine learning model that minimizes a computational output associated with the L2-loss function.

9. The method of claim 2, wherein the neural network includes a plurality of neural network layers that receive multiple layer inputs, and where training the neural network based on the first loss function includes:

performing batch normalization to normalize layer inputs to a particular neural network layer; and minimizing covariate shift in response to performing the batch normalization.

10. The method of claim 2, wherein the second loss function is a triplet loss function and generating the respective machine learning models includes:

generating a particular machine learning model based on associations between an anchor image, a positive image and a negative image.

11. A system for generating a unified machine learning model using a neural network, the system comprising:

a data processing apparatus configured to implement the neural network, the data processing apparatus including one or more processing devices; and one or more non-transitory machine-readable storage devices storing instructions that are executable by the one or more processing devices to cause performance of operations comprising:

determining, by the data processing apparatus and for the neural network, respective each learning targets for each of a plurality of object verticals, wherein each object vertical defines a distinct category for an object that belongs to the vertical, wherein each distinct category comprises a particular object class, wherein each respective learning target comprises an embedding output generated by a respective specialized model of a plurality of specialized models, wherein the plurality of specialized models are individually trained, wherein the respective specialized model is associated with a particular object vertical of the plurality of object verticals, wherein each distinct specialized model of the plurality of specialized models was trained for a different object class;

training, by the data processing apparatus and based on a first loss function, the neural network to identify data associated with each of the plurality of object verticals, wherein the neural network is trained to generate one or more feature embeddings associated with the embedding output of the respective learning targets generated by a respective specialized model, wherein the first loss function differs from a second loss function, wherein the plurality of specialized models are trained with the second loss function, wherein training with the first loss function comprises:

training the neural network to generate one or more particular feature embeddings that emulate the embedding output of the respective specialized model associated with a particular object vertical associated with a subset of training data being processed by the neural network, wherein the respective specialized model differs based on the particular object vertical and the respective portion of training data; and generating, by the data processing apparatus and using the neural network trained based on the first loss function, a unified machine learning model configured to identify items that are included in the data associated with each of the plurality of object verticals.

12. The system of claim 11, wherein determining respective learning targets for the neural network further comprises:

training, by the data processing apparatus and based on the second loss function, at least one other neural network to identify data associated with each of the plurality of object verticals;

in response to training, generating, by the data processing apparatus, two or more embedding outputs, where each embedding output indicates a particular learning target and includes a vector of parameters that correspond the data associated with particular object vertical; and generating, by the data processing apparatus and using the at least one other neural network trained based on the second loss function, respective machine learning models, each machine learning mode being configured to use a particular embedding output.

13. The system of claim 12, wherein each of the plurality of object verticals corresponds to particular category of items and the data associated with each of the plurality of object verticals includes image data of an item in the particular category of items.

14. The system of claim 13, wherein the particular category is an apparel category and items of the particular category include at least one of: handbags, shoes, dresses, pants, or outerwear; and wherein the image data indicates an image of at least one of: a particular handbag, a particular shoe, a particular dress, a particular pant, or particular outerwear.

15. The system of claim 14, wherein:

each of the respective machine learning models are configured to identify data associated with a particular object vertical and within a first degree of accuracy; and the unified machine learning model is configured to identify data associated with each of the plurality of object verticals and within a second degree of that exceeds the first degree of accuracy.

16. The system of claim 12, wherein determining the respective learning targets for each of the plurality of objects verticals, comprises:

analyzing the two or more embedding outputs, each embedding output corresponding to a particular object vertical of the plurality of object verticals; and based on the analyzing, determining the respective learning targets for each of the plurality of object verticals.

17. The system of claim 12, wherein the first loss function is an L2-loss function and generating the unified machine learning model includes:

generating a particular unified machine learning model that minimizes a computational output associated with the L2-loss function.

18. The system of claim 12, wherein the neural network includes a plurality of neural network layers that receive multiple layer inputs, and where training the neural network based on the first loss function includes:

performs batch normalization to normalize layer inputs to a particular neural network layer; and minimizing covariate shift in response to performing the batch normalization.

19. The system of claim 12, wherein the second loss function is a triplet loss function and generating the respective machine learning models includes:

generating a particular machine learning model based on association between an anchor image, a positive image, and a negative image.

20. One or more non-transitory machine-readable storage devices storing instructions that are executable by the one or more processing devices to generate a unified machine learning model and to cause performance of operations comprising:

determining, by a data processing apparatus configured to implement a neural network, respective learning targets for each of a plurality of object verticals, wherein each object vertical defines a distinct category for an object that belongs to the vertical, wherein each object vertical comprises a different type of apparel item of a plurality of various types of apparel items, wherein each respective learning target comprises an embedding output generated by a respective specialized model of a plurality of specialized models, wherein the plurality of specialized models are individually trained, wherein the respective specialized model is associated with a particular object vertical of the plurality of object verticals, wherein each distinct specialized model of the plurality of specialized models was trained for a different object class, wherein determining respective learning targets for each of a plurality of object verticals comprises:

processing a first set of training data with a first specialized model associated with a first object class to generate a first set of embedding outputs; and processing a second set of training data with a second specialized model associated with a second object class to generate a second set of embedding outputs;

training, by the data processing apparatus and based on a first loss function, the neural network to identify data associated with each of the plurality of object verticals, wherein the neural network is trained to generate one or more feature embeddings associated with the embedding output of the respective learning targets of a respective specialized model, wherein the first loss function differs from a second loss function, wherein the plurality of specialized models are trained with the second loss function, wherein the first loss function comprises an L2 loss function, and wherein the second loss function comprises a triplet loss function, wherein training the neural network comprises:

training the neural network to generate one or more first feature embeddings to emulate the first set of embedding outputs based on the first set of embedding outputs being the respective learning target when processing the first set of training data; and training the neural network to generate one or more second feature embeddings to emulate the second set of embedding outputs based on the second set of embedding outputs being the respective learning target when processing example from the second set of training data; and generating, by the data processing apparatus and using the neural network trained based on the first loss function, a unified machine learning model configured to identify items that are included in the data associated with each of the plurality of object verticals.

\* \* \* \* \*